Patented Aug. 19, 1952

2,607,427

UNITED STATES PATENT OFFICE 2,607,427

SEALING COMPOSITION AND METHOD FOR TEMPORARILY SEALING OIL WELLS

Donald C. Bond, Northbrook, and Michael Savoy, Chicago, Ill., assignors to The Pure Oil Company, Chicago, Ill., a corporation of Ohio No Drawing. Application August 29, 1946, Serial No. 693,828

11 Claims. (Cl. 166—22)

This invention relates to a composition of matter especially suitable for sealing of earth bored holes, wells, or dams, and is particularly adaptable to the sealing of wells before acid-treating and the selective sealing of portions of wells to be acid treated.

Treatment of oil wells with hydrochloric acid to increase the porosity of calcareous formations to facilitate the extraction of oil is often a desirable expedient. Before or during such treatment of an oil well, it often becomes desirable to seal off one or more sections in order to restrict the action of the treating agent to a particular formation. Subsequently, it becomes necessary to remove the seal in order to make further use of the well.

Common sealing methods in use employ either an inorganic cementing agent like plaster of Paris which has an appreciable time lag in its setting characteristics to permit the slurry to be pumped underground, or an organic gel which temporarily seals the earth formation. Both methods are subject to serious disadvantages, the first because the hardened inorganic cement must be removed mechanically when the seal is no longer needed, and the second because the organic gel generally contains bacteria, which, by their normal activity, produce a liquefaction of the seal. Sometimes the bacteria liquefy the seal prematurely, other times it is necessary to wait after need for the seal has passed until liquefaction is complete. It is apparent that in neither process do the surface operators have any control over the selectivity of the sealing or the time factor involved in the sealing operation.

Accordingly, it is an object of the invention to provide a composition for sealing off earth structures, particularly oil wells and acid treated oil wells, so that the seal can be opened at least as readily as it can be made. In the preferred manner of using the composition it is possible to effect selective or temporary sealing of any part of a well to be acid treated, or, if desired, the entire well.

It is another object of the invention to provide a sealing composition in the form of a ready-mixed powder having a controllable setting time which can be matched to the particular sealing problem.

Still another object of the invention is to provide a novel method for temporarily sealing off well formations.

A further object of the invention is to provide a method for the selective treatment of wells with acid and the composition of this invention.

Other objects and advantages of the invention will in part be obvious, and in part appear hereinafter.

We have discovered that a well sealing cement can be prepared from a combination of calcined gypsum cements and an amide, preferably an amide of an inorganic acid, typified by sulfamic and phosphamic acids, which combination of ingredients develops to a useful degree the property of being acid resistant and subject to disintegration by alkali and alkali-metal salts of nitrous acid when the composition is mixed with water and allowed to set, that is, the set cement is inert to and unaffected by acids of about the concentration generally encountered in oil well treatment processes, and is softened and disintegrated completely by such alkaline materials as alkali metal hydroxides, carbonates, and nitrites. Typical compositions comprise mixtures of plaster of Paris and set-stabilized alpha gypsum, to obtain a desirable setting characteristic and sufficient strength for the intended purpose, an amide to furnish susceptibility to alkali or nitrite and other addition agents such as set retarding agents to provide additional control over the setting time.

Set retarders can be added to the composition to control the setting time, and they can be selected from such classes of materials as glycerine, or gelatin, commercial set retarders such as hydrolyzed protein, natural gums such as gum arabic, and similar organic materials, as well as crystalline set retarders, such as citric, tartaric, and other hydroxy organic acids, and salts, alums and the like. However, it is preferred to prepare the cement in a dry powder form so that it can be handled conveniently and incorporated with water on the spot as needed. Accordingly, such dry crystalline set retarding agents as hydroxy organic acids and their soluble salts, of which citric and tartaric acids are typical, are generally preferred.

A typical product of the invention comprises a mixture of two forms of calcined gypsum cement, namely, common plaster of Paris, and the form known to the trade as "Calseal," a product of the U. S. Gypsum Company, the composition and preparation of which are described in United States Patents 1,901,051; 1,901,052; 1,901,054; 1,901,056; 1,979,704; 2,032,071; and 2,292,616. The "Calseal" is essentially a pure form of alpha gypsum or calcium sulfate hemihydrate which is prepared by steam pressure calcination and is set stabilized to give it a lengthened stable setting time.

With the two forms of calcined gypsum cement there is mixed a smaller proportion of crystalline inorganic acid amide, such as sulfamic acid, and, if desired or needed, a minor, but effective, amount of a set retarding agent, such as citric acid. When the ingredients are mixed in the proportions of about equal parts by weight of the gypsum cements, about one-third as much sulfamic acid, and up to about 5 per cent by weight of the set retarding agent, a cement composition is produced which develops useful characteristics of acid resistance and alkali metal salt susceptibility, that is, the cement will have a setting time of about one to two hours, thereby permitting the slurry which is made up when water is added to be pumped into the earth formation to be sealed. The composition will then set to a hard, strong mass which is not affected appreciably over periods as long as 24 to 48 hours by hydrochloric acid of a concentration of about 15 per cent. However, the cement, after it has set, is quickly disintegrated by alkali or alkali metal nitrites in about 40 per cent aqueous solution.

In the preparation of the composition the dry powdered ingredients are weighed out in the proportions needed and thoroughly mixed in some form of mechanical mixing device, such as a pebble mill. The depth of the earth formation it is desired to seal having been determined, all that remains is to disperse the dry powder with about one-half to three-fourths of its weight of water to form a smooth slurry of rather high flowability and to pump it into the formation. Should the formation to be sealed be extremely deep, it might be desirable to add set retarding agent in amount sufficient to delay setting for an hour or two in order to allow time for the slurry to reach and permeate the particular formation.

The following examples will illustrate a few typical compositions prepared according to our invention:

Example I

A mixture of 10 parts by weight of plaster of Paris, 10 parts "Calseal" Number 60, 7 parts of sulfamic acid, and 0.5 part citric acid was prepared in dry form. When mixed with 15 parts of water it formed a smooth easy flowing cream which was fluid for an hour and at the end of two hours had set to a very hard solid mass. After drying, the set mass was submerged in 15 per cent hydrochloric acid for 24 hours with no sensible effect on the hardness or rigidity of the mass. Subsequently, when submerged in 40 per cent aqueous sodium nitrite solution, the cement was rapidly disintegrated and within a few minutes had been reduced to a wet slurry.

Example II

A mixture of 5 parts by weight of plaster of Paris, 15 parts "Calseal" Number 60, 5 parts of sulfamic acid, and 1 part of citric acid was prepared in dry form. When mixed with 15 parts of water it formed a smooth easy flowing slurry which was fluid for one and one-half hours before setting to a hard solid mass. The mass was submerged in 15 per cent hydrochloric acid for 24 hours after which time its surface showed only superficial softening. Upon treatment with 40 per cent sodium nitrite solution a rapid reaction occurred which resulted in the production of considerable gas and the cement was disintegrated within three minutes.

Example III

A mixture of 10 parts by weight of plaster of Paris, 15 parts of "Calseal" Number 60, 7 parts of sulfamic acid, and 0.75 part citric acid was prepared in dry form. When mixed with 25 parts of water it formed a free-flowing cream which set to a hard solid mass in two hours. The set cement was unaffected by 15 per cent hydrochloric acid when exposed to it for a period of 24 hours, but was disintegrated completely in a few minutes by 40 per cent aqueous sodium nitrite solution.

Cement samples having the compositions indicated above, that is, about 30 to 70 per cent plaster of Paris, about 30 to 70 per cent "Calseal," about 10 to 40 per cent sulfamic acid, and up to about 5 per cent of a set retarding agent, all by weight, were prepared and tested according to the procedure outlined. The samples were allowed to set to full strength and then submerged in 15 per cent hydrochloric acid for 24 hours. In no case did more than superficial softening of the surface of the sample occur. Subsequently, the samples were submerged in aqueous alkali metal nitrite solution of 20 to 50 per cent concentrations. In all cases the samples were disintegrated in a few minutes. Alkali metal hydroxides also have a disintegrating effect, but are substantially slower than the nitrites. It appears that the disintegrating reaction is one which takes place between the alkali or nitrite and the amide included in the cement. Since the amide, for example, sulfamic acid, is dispersed throughout the crystallized foraminous structure of the cement, its neutralization or destruction disintegrates the structure. In the cases of the treatment of the cements described in the examples with nitrite solution, a strong reaction occurs between the nitrite group of the compound used and the amide group of the sulfamic acid with the evolution of nitrogen. The strong evolution of the gas helps to disengage particles of the cement, thereby accelerating the disintegration process.

The advantages resulting from employing this acid-resistant and alkali- or nitrite-susceptible cement are apparent, for this combination of properties makes possible the selective sealing of portions of an oil well, and gives the surface operators precise control of the time the well is sealed and out of operation. For example, should it be desired to seal a portion of a well a few thousand feet underground, use of this composition makes it possible to have that section of the well sealed within a matter of a few hours. When the necessity for the seal is over, the seal made with the composition described can be disintegrated and removed even more quickly than it was set in place, whereas use of conventional sealing agents would require time-consuming mechanical operations, or a 24 to 48 hour wait for the bacterial action to disintegrate the organic gel.

Although the composition of this invention possesses particular value in the sealing of oil wells and earth formations which are to be acid treated because of the acid insolubility of the cement, its usefulness is not restricted to such situations. It can be used in any cementing or earth sealing application and its use is of decided advantage when the seal is merely intended to be temporary.

Since certain changes in the composition described involving variation of proportions and specific nature of ingredients, and thereby, different embodiments of the invention could be made without departing from its scope, it is intended that all matter contained in the above description shall be interpreted as illustrative and not in a limiting sense.

What is claimed is:

1. A composition suitable for sealing earth formations comprising, hemihydrate calcium sulfate, a hydrated calcium sulfate prepared from gypsum which has been steam calcined under superatmospheric perssure, and about 10-40 per cent by weight of an amide, said amide having an $NH_2$ radical substituted for the hydroxyl substituent of an acid derived nucleus, said composition being characterized by its capacity to set to a hard solid containing the amide interspersed therethrough upon hydration with water, the solid being resistant to acid attack but subject to disintegration by reaction of the amide with alkalies and nitrites.

2. A composition suitable for sealing earth formations comprising, about 30 to 60 per cent of hemihydrate calcium sulfate, about 30 to 60 per cent of a hydrated calcium sulfate prepared from gypsum which has been calcined under superatmospheric pressure and stabilized with respect to its hydration and setting time, and about 10 to 40 per cent of an amide, said amide having an $NH_2$ radical substituted for the hydroxyl substituent of an acid derived nucleus, said composition being characterized by its capacity to set to a hard solid containing the amide interspersed therethrough, the solid being resistant to acid attack, but subject to disintegration by reaction of the amide with alkalies and nitrites.

3. A composition in accordance with claim 2 in which the hemihydrate calcium sulfate and the hydrated calcium sulfate prepared from pressure calcined gypsum are present in substantially equal proportions and the amide is sulfamic acid.

4. A composition in accordance with claim 2 in which the hemihydrate calcium sulfate and the hydrated calcium sulfate prepared from pressure calcined gypsum are present in substantially equal proportions and the amide is phosphamic acid.

5. A composition in accordance with claim 2 which contains up to about 5 per cent of a non-alkaline, water soluble set retarding agent.

6. A method of temporarily sealing an earth formation comprising, injecting into the formation an aqueous cementitious slurry comprising a gypsum cement in an amount sufficient to form a hard solid resistant to acid attack, said cement containing about 10-40 per cent by weight of an amide, said amide having an $NH_2$ radical substituted for the hydroxyl substituent of an acid derived nucleus, permitting the cementitious slurry to set, thereby to form the seal and subsequently disintegrating the seal by contacting it with aqueous nitrite solution.

7. The method of temporarily sealing an oil well formation to permit acidizing of an adjacent formation comprising, injecting into the formation to be sealed an aqueous cementitious slurry comprising a gypsum cement containing an amide in the amount of about 15 to 45 per cent by weight, said amide having an $NH_2$ radical substituted for the hydroxyl substituent of an acid derived nucleus, said cement being present in an amount sufficient to form a hard solid resistant to attack by 15 per cent hydrochloric acid, hydrating the cement to cause it to set and form a seal resistant to acid attack, and subsequently disintegrating the seal after acidizing the well by contacting the seal with aqueous nitrite solution to react with the amide.

8. A method in accordance with claim 7 in which the said amide is selected from the group consisting of sulfamide and phosphamide.

9. A method in accordance with claim 7 in which the amide is sulfamide.

10. A method in accordance with claim 7 in which the amide is phosphamide.

11. The method of rendering a set foraminous gypsum cement formation subject to disintegration by nitrous acid and soluble nitrites comprising, incorporating about 10-40 per cent by weight of a water soluble amide, said amide having an $NH_2$ radical substituted for the hydroxyl substituent of an acid derived nucleus, into an aqueous cementitious slurry, containing said gypsum cement in an amount sufficient to form a hard solid prior to its setting, said amide being present in an amount sufficient to disintegrate the cement formation upon reaction thereof with a water soluble nitrite.

DONALD C. BOND.
MICHAEL SAVOY.

REFERENCES CITED

The following references are of record in the file of this patent:

UNITED STATES PATENTS

| Number | Name | Date |
|---|---|---|
| 2,045,899 | Davis | June 30, 1936 |
| 2,127,662 | Grebe | Aug. 23, 1938 |
| 2,152,670 | Shutt | Apr. 4, 1939 |
| 2,161,085 | Phalen | June 6, 1939 |
| 2,187,895 | Sanders | Jan. 23, 1940 |
| 2,191,555 | Berliner | Feb. 27, 1940 |
| 2,216,207 | Menaul | Oct. 1, 1940 |
| 2,341,426 | Dailey | Feb. 8, 1944 |

FOREIGN PATENTS

| Number | Country | Date |
|---|---|---|
| 453,703 | Great Britain | of 1936 |